United States Patent [19]

Gehman et al.

[11] Patent Number: 4,708,358
[45] Date of Patent: Nov. 24, 1987

[54] DISABLED TRUCK TRACTOR RECOVERY UNIT

[75] Inventors: Roland P. Gehman, Stevens; Raymond G. Martin, East Earl, both of Pa.

[73] Assignee: MGS, Inc., Denver, Pa.

[21] Appl. No.: 884,703

[22] Filed: Jul. 11, 1986

[51] Int. Cl.$^4$ .............................................. B60P 3/12
[52] U.S. Cl. .............................. 280/402; 280/415 A; 414/563
[58] Field of Search .............. 280/402, 415 R, 415 B, 280/482, 495, 503, 415 A, 478 R, 479 R, 490 R; 414/563

[56] References Cited

U.S. PATENT DOCUMENTS

| | | | |
|---|---|---|---|
| 2,481,223 | 9/1949 | Johnson | 414/86 |
| 2,663,574 | 12/1953 | Martin | 280/415 R |
| 3,384,390 | 5/1968 | Moiriat et al. | 280/423 |
| 3,587,893 | 6/1971 | Laken | 414/620 |
| 3,645,559 | 2/1972 | Stafford, Jr. | 280/415 B |
| 3,666,130 | 5/1972 | Ellerd | 414/621 |
| 3,715,042 | 2/1973 | Rellinger | 414/86 A |
| 3,719,294 | 3/1973 | Aquila | 280/402 |
| 3,837,673 | 9/1974 | McCarthy | 280/415 B |
| 3,881,749 | 5/1975 | Berends | 280/415 B |
| 4,047,733 | 9/1977 | Parkes | 280/402 |
| 4,052,084 | 10/1977 | Propst | 280/408 |
| 4,149,643 | 4/1979 | Skala | 414/563 |
| 4,152,006 | 5/1979 | Dunlap | 280/402 |
| 4,316,617 | 2/1982 | Flaugh | 280/402 |
| 4,544,175 | 10/1985 | Hubert | 280/402 |
| 4,555,214 | 11/1985 | Morton | 414/563 |
| 4,611,821 | 9/1986 | Jeanson | 280/482 |

Primary Examiner—John J. Love
Assistant Examiner—Everett G. Diederiks, Jr.
Attorney, Agent, or Firm—Michael R. Swartz; John R. Flanagan

[57] ABSTRACT

A recovery unit for use by one truck tractor in towing another disabled truck tractor has an anchoring frame assembly with a king pin for coupling to a fifth wheel of the towing tractor and an attaching frame assembly with a king pin for coupling to a fifth wheel of the disabled tractor. The attaching frame assembly is mounted for pivotal movement relative to the anchoring frame assembly between stored and extended conditions. Actuating cylinders and an auxiliary frame assembly are selectively operable to pivot the attaching frame assembly relative to the anchoring frame assembly between the stored and extended conditions and to pivot the attaching frame assembly to and from an erected position relative to the anchoring frame assembly once the attaching frame assembly has been first moved to its extended condition and coupled to the fifth wheel of the disabled tractor. When the attaching frame assembly is moved to its erected position, this results in the frame of the disabled tractor being placed in a raised towing position. In the erected position, the attaching frame assembly can be rigidly locked to the anchoring frame assembly to form a rigid beam extending between and interconnecting the respective fifth wheels of the tractors.

20 Claims, 12 Drawing Figures

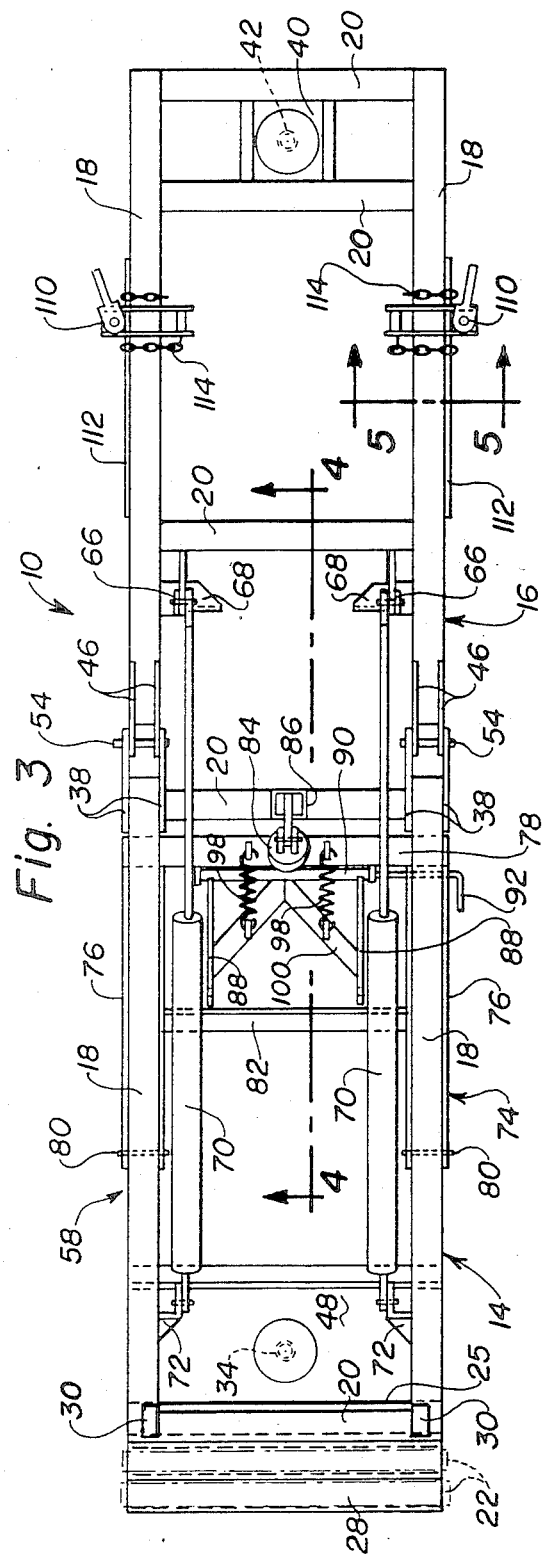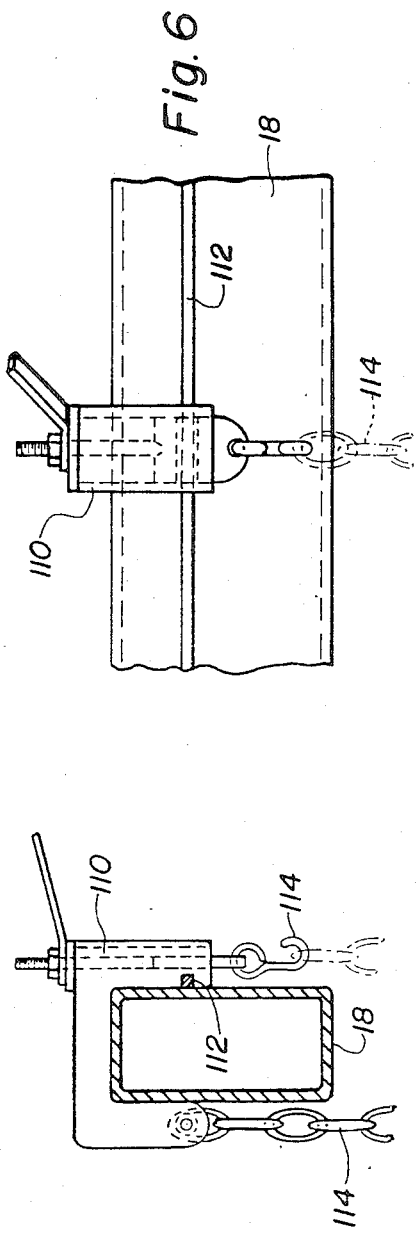

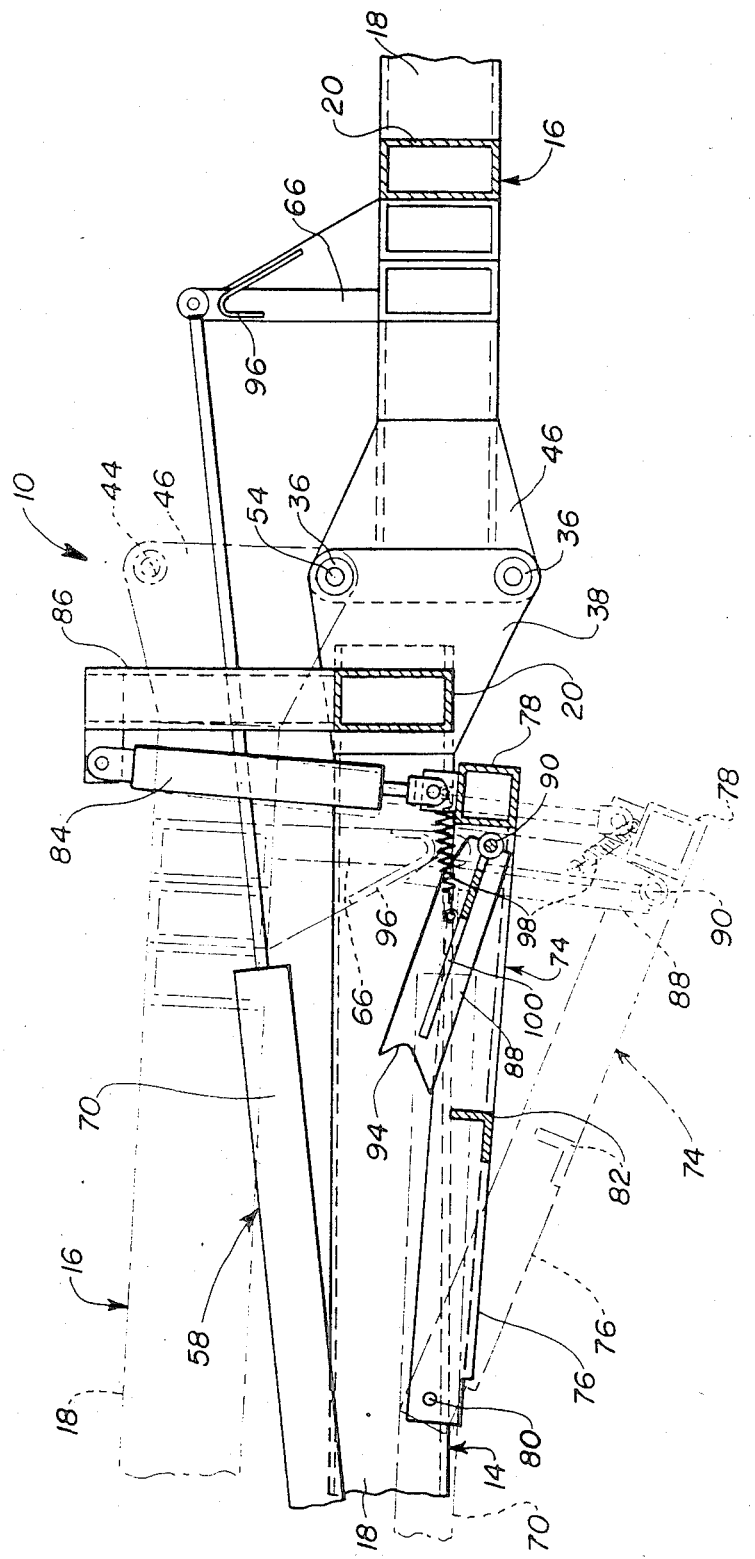

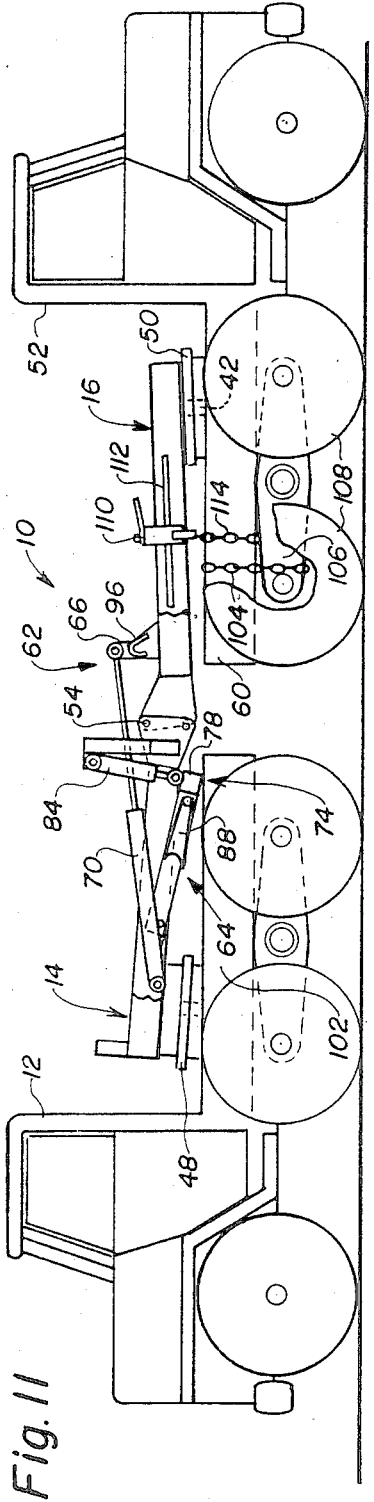
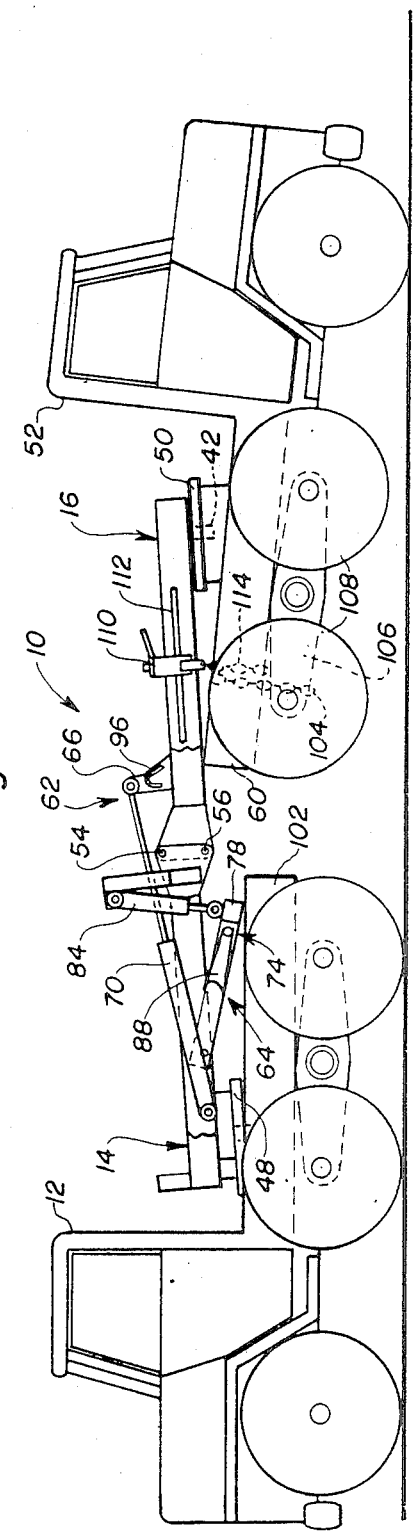
Fig. 11
Fig. 12

DISABLED TRUCK TRACTOR RECOVERY UNIT

BACKGROUND OF THE INVENTION

1. Field of the Invention

The present invention relates generally to transporting disabled vehicles and, more particularly, is concerned with a recovery unit for hitching a disabled truck tractor to a towing truck tractor in a manner comparable to normal tractor trailer operations which enhances the safety and efficiency of disabled tractor retrieval efforts.

2. Description of the Prior Art

Due to intense usage of truck tractor and trailer rigs in transporting the bulk of goods and freight over the nation's highways, it is to be expected that tractor breakdown will be a frequent occurrence. Typically, a disabled tractor has to be removed from the highway to a service facility in order for repairs to be made. Removal normally requires towing the disabled tractor by using a large tow truck specially equipped and dedicated for that purpose. However, such tow trucks are expensive and so in many areas of the country there are either none available or there will usually be considerable delay in obtaining the services of one when a breakdown occurs.

Over the years, several attempts have been made to temporarily adapt an ordinary truck tractor to perform such towing tasks in addition to its normal use as part of a tractor and trailer rig. The objective is to eliminate the need to locate a dedicated tow truck in order to remove a disabled tractor from the highway to a service facility. The advantage in being able to use another tractor is that such tractors are found with much greater frequency in all parts of the country than are dedicated tow trucks and thus one would surely be quickly and conveniently available about anywhere the need might arise. Representative of the hoist and towing mechanisms devised in the prior art for this purpose are the ones disclosed in U.S. Pat. Nos. to Johnson (2,481,223) and Parkes (4,047,773). Bothe of these mechanisms take advantage of the fifth wheel on the towing tractor to convert it for towing a disabled tractor instead of a trailer. However, of these two prior art mechanisms, Parkes is the superior one due to, among other reasons, its recognition of the added advantage of utilizing the fifth wheel on the disabled tractor to complete the towing connection between the two tractors.

While the mechanism of Parkes can be operated so as to generally achieve the objective of adapting a truck tractor for the purpose of towing a disabled tractor, nonetheless it seems to embody certain shortcomings which make it less than an optimum solution to the problem of removing a disabled tractor. Consequently, a need still exists for renewed efforts to come up with a design which will improve removal of a disabled tractor in a safer and more economical and efficient manner using another tractor.

SUMMARY OF THE INVENTION

The present invention provides a disabled truck tractor recovery unit designed to satisfy the aforementioned needs. The recovery unit of the present invention retains the advantages of the Parkes hoist mechanism while eliminating its disadvantages. The recovery unit is designed to be operated by one person without the need for additional equipment, other than the towing tractor on which it is mounted. Since it is stored in a free-standing condition and ready to use, there is no need for such equipment as a chain hoist or forklift. In addition, it does not require removal of light, bumpers, or other parts of a disabled tractor. Electrical and hydraulic powered components are provided to operate the recovery unit, thereby requiring no heavy manual work on the part of the operator. Also, the operator is not required to assume a position relative to the unit where he is susceptible to being injured. The safety of the recovery unit is enhanced by its utilization of a method which results in its operation being close to that of normal tractor trailer operations. The unit advantageously directs the weight of the load downward onto the road via the fifth wheel of the tractor, as the driver is accustomed to when hauling a trailer. The turning radius of a complete rig (the combination of the towing and towed vehicles and the recovery unit) when retrieving exceeds ninety degrees, allowing one man, exercising normal driving skills, to safely and efficiently recover any disabled tractor using the recovery unit.

Accordingly, the present invention is directed to a recovery unit for use by one truck tractor in towing another truck tractor wherein each tractor has a fifth wheel. The recovery unit includes: (a) first frame means adapted to be coupled to a fifth wheel of a towing tractor; (b) second frame means adapted to be coupled to a fifth wheel of a towed tractor, with the second frame means being mounted to the first frame means for movement relative thereto between a stored condition wherein it is disposed adjacent to the first frame means and incapable of being coupled to the fifth wheel of the towed tractor and an extended condition wherein it forms an extension of the first frame means and is capable of being coupled to the fifth wheel of the towed tractor; and (c) an actuating mechanism being selectively operable to move the second frame means relative to the first frame means between the stored and extended conditions, the actuating mechanism also being selectively operable to move the second frame means to and from an erected position relative to the first frame means, once the second frame means has been first moved to its extended condition and then coupled to the fifth wheel of the towed tractor, such that a portion of the frame of the towed tractor is placed in a raised towing position.

More particularly, the first frame means has front and rear portions and includes a king pin mounted at its front portion for coupling to the fifth wheel of the towing tractor and pivot means defined at its rear portion. The second frame means has forward and rearward portions and includes a king pin mounted at its rearward portion for coupling to the fifth wheel of the towed tractor and complementary pivot means defined at its forward portion being pivotally connected to the pivot means of the first frame means.

Further, the unit has flexible means for attaching a portion of the frame of the towed tractor to the second frame means prior to the second frame means being moved to the erected position. Also, locking means are provided for connecting the second frame means to the first frame means after the second frame means is moved to the erected position to form the first and second frame means into a solid towing beam interconnecting the fifth wheels of the towing and towed tractors.

Still further, the actuating mechanism includes first and second actuating means. The first actuating means is selectively operable to move the second frame means relative to the first frame means between the stored and extended conditions, and also operable to move the second frame means to and from the erected position relative to the first frame means once the second frame means has been first moved to its extended condition and coupled to the fifth wheel of the towed tractor. The second actuating means is selectively operable to move the first frame means relative to a frame of the towing tractor after being coupled to the fifth wheel of the towing tractor and to move the second frame means relative to the first frame means in coordination with operation of the first actuating means in order to move the second frame means relative to the first frame means between the stored and extended conditions, and, after the second frame means is moved to the extended condition and coupled to the fifth wheel of the towed tractor, to move the second frame means to the erected position, causing the portion of the towed tractor to be placed in the raised towing position.

Preferably, the first actuating means includes at least one crank arm attached to and extending outwardly from the second frame means, and at least one telescopible actuator pivotally attached at its opposite ends to and extending between the first frame means and an outer end of the crank arm. The second actuating means includes an auxiliary frame means pivotally attached to the first frame means for pivotal movement toward and into contact with the frame of the towing tractor, at least one telescopible actuator pivotally attached to and extending between the auxiliary frame means and the first frame means for pivoting the first frame means relative to the auxiliary frame means and thereby to the frame of the towing tractor when the auxiliary frame means is in contact with the frame of the towing tractor, and at least one support arm pivotally attached to the auxiliary frame means and selectively movable relative thereto between nonsupporting and supporting positions wherein the support arm is respectively disengaged from and engaged with the crank arm of the first actuating means. The support arm is biased to move toward its supporting position.

Yet further, the recovery unit includes a plurality of support members supportable on the ground and releasably attachable in upright relationship to the first frame means for supporting the unit in a free-standing condition with the second frame means thereof in the stored condition overlying the first frame means so as to facilitate removal of the recovery unit from the towing tractor.

These and other advantages and attainments of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the course of the following detailed description, reference will be made to the attached drawings in which:

FIG. 3 is a top plan view of the recovery unit with the towing tractor omitted and the attaching frame assembly being in its extended condition relative to the anchoring frame assembly of the unit.

FIG. 4 is an enlarged detailed elevational view, partly in section, of the actuating mechanism of the recovery unit as seen along line 4—4 of FIG. 3.

FIG. 5 is an enlarged detailed elevational view, partly in section, of one of the adjustable brackets mounted on the attaching frame assembly of the recovery unit as seen along line 5—5 of FIG. 3.

FIG. 6 is a side elevational view of the adjustable bracket as seen from the right side of FIG. 5.

FIG. 7 to 12 are a sequence of views illustrating the recovery unit at successive stages in which its anchoring and attaching frame assemblies are being progressively moved to form a rigid beam connecting the respective fifth wheels of the towing and towed tractors with the latter being in a raised towing position.

DETAILED DESCRIPTION OF THE INVENTION

Figure 1:
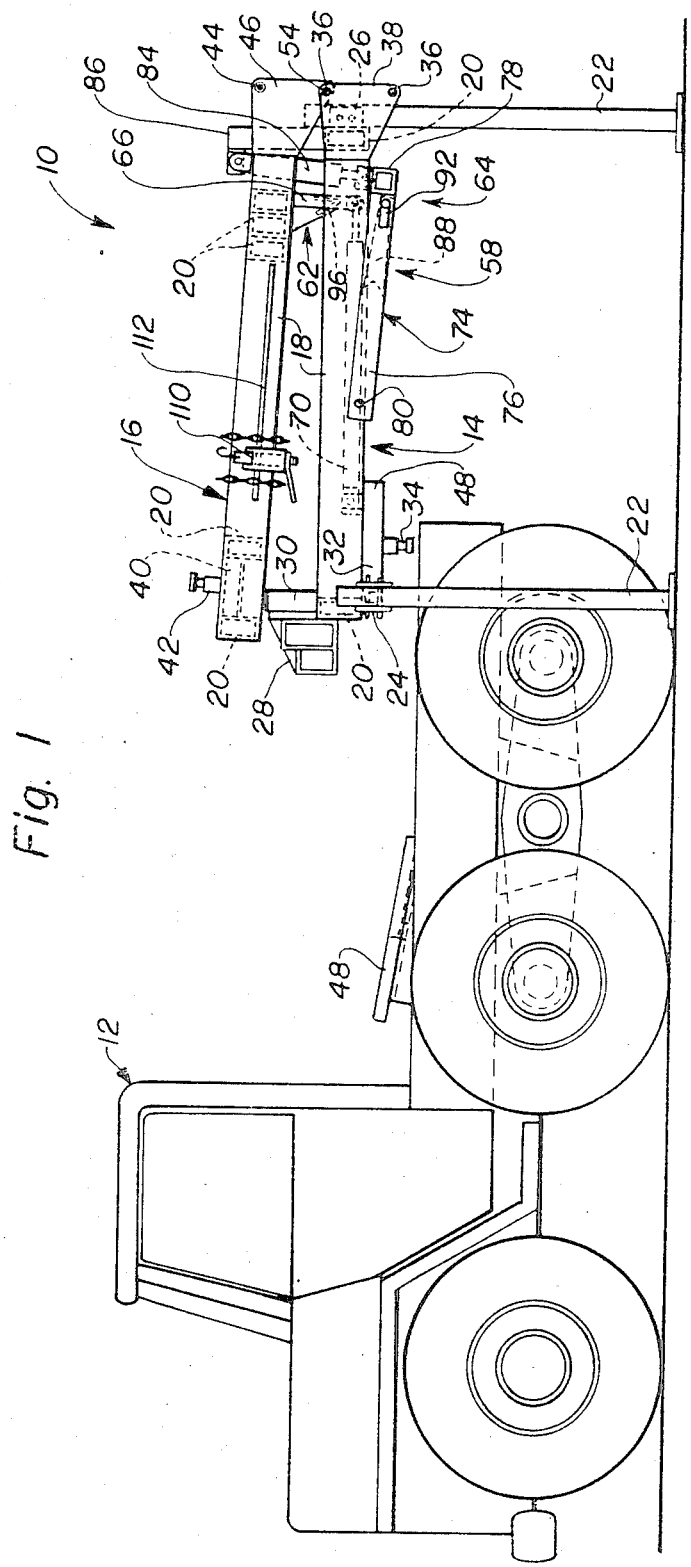
FIG. 1 is a side elevational view of the recovery unit of the present invention in a free-standing condition with a towing tractor in the process of backing under it.

In the following description, like reference characters designate like or corresponding parts throughout the several views of the drawings. Also in the following description, it is to be understood that such terms as "forward", "rearward", "left", "right", "upwardly", "downwardly", and the like are words of convenience and are not to be construed as limiting terms.

Figure 2:
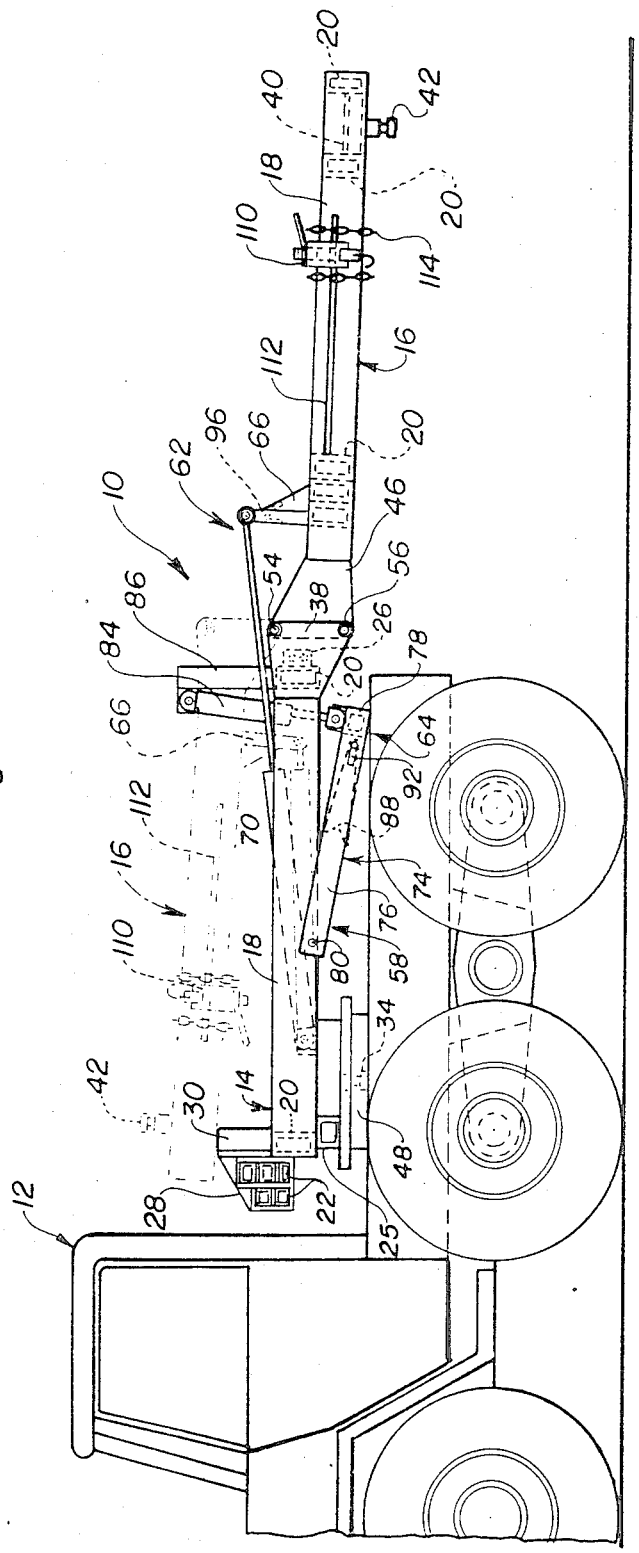
FIG. 2 is a side elevation view of the recovery unit mounted on the towing tractor and showing the stored and extended conditions respectively in phantom and solid line forms of the attaching frame assembly of the recovery unit relative to the anchoring frame assembly of the unit.

Referring now to the drawings, and particularly to FIGS. 1-3, there is shown a preferred embodiment of a disabled truck tractor recovery unit, generally designated by the numeral 10 and constructed in accordance with the present invention. In FIG. 1, the recovery unit 10 is depicted in a free-standing condition with a towing tractor 12 in the process of backing under it, whereas, in FIG. 2, the recovery unit 10 has been mounted on the towing tractor 12, with two of the basic components of the recovery unit 10, an anchoring frame assembly 14 and an attaching frame assembly 16, being illustrated in respective phantom and solid line forms in stored and extended conditions.

Both anchoring and attaching frame assemblies 14,16 are composed of respective longitudinal beams 18 and cross beams 20 rigidly interconnected to form rectangular-shaped open structures, with the attaching frame assembly 16 being slightly longer than the anchoring frame assembly 14. As seen in FIG. 1, a pair of support legs 22 and a pair of arms 24 (only one of each being shown) are releasably attached in respective upright and horizontal orientations at the opposite ends of another front cross beam 25 of the anchoring frame assembly 12 and a third support leg 22 is releasably attached in an upright orientation to a bracket 26 at the middle of the rear side of the rear cross beam 20 of the anchoring frame assembly 14 to support the recovery unit 10 in the free-standing condition on the ground. More specifically, each support arm 24 is inserted into one of the opposite ends of the hollow front cross beam 25 and then the support legs 22 are locked to the outer ends of the respective support arms 24.

Once the recovery unit 10 has been mounted on the towing truck 12, the support legs 22 and arms 24 are released and removed from the anchoring frame assembly 14. As seen in FIG. 2, they are then stored individually in elongated slots defined in a storage rack 28 fixedly attached along the front cross beam 20 and between a pair of short upright support posts 30 at the front end of the anchoring frame assembly 14. The posts 30 also serve to support the rear end of the attaching frame assembly 16 when inverted and resting in its stored condition.

The anchoring frame assembly 14 has a plate 32 mounting a downwardly extending king pin 34 and being attached across its longitudinal beams 18 at the front portion thereof. Also, the assembly 14 has upper and lower pivotal mounting holes 36 defined in plates 38 being attached to the assembly 14 at opposite sides of the rear portion thereof. Similarly, the attaching frame assembly 16 has a plate 40 mounting a downwardly extending king pin 42 and being attached between a pair of the cross beams 20 at the rear portion thereof. Further, the assembly 16 has upper and lower complementary pivotal mounting holes 44 defined in plates 46 being attached to the assembly 16 at opposite sides of the forward portion thereof. The king pin 34 of the anchoring frame assembly 14 adapts it to be coupled to a fifth wheel 48 of the towing tractor 12, whereas the king pin 42 of the attaching assembly frame 16 adapts it to be coupled to a fifth wheel 50 of a disabled tractor 50 (as seen in FIGS. 7-12) to be towed using the recovery unit 10. The attaching frame assembly 16 is pivotally connected to the anchoring frame assembly 14 by pins 54 extending through the upper ones of their complementary mounting holes 36,44. Such pivotal connection allows pivotal movement of the attaching frame assembly 16 between its stored and extended conditions relative to the anchoring frame assembly 14, as seen respectively in phantom and solid line forms in FIG. 2. When the attaching frame assembly 16 is pivoted to its extended condition, and more specifically to an erected position seen in FIGS. 2 and 12, relative to the anchoring frame assembly 14, pins 56 can be extended through the lower ones of their aligned complementary mounting holes 36,44 to rigidly lock the assemblies in fixed relation so as to form a solid towing beam which will interconnect the fifth wheels 48,50 of the tractors 12,52. It will be noticed that when the attaching frame assembly 16 is at its stored condition, wherein it overlies the anchoring frame assembly 14, it is incapable of being coupled to the disabled tractor fifth wheel 50, whereas when the attaching frame assembly 16 is at its extended condition, wherein it forms a rearward extension of the anchoring frame assembly 14, it is capable of being aligned with and coupled to the fifth wheel 50.

Another basic component of the recovery unit 10 is an actuating mechanism, generally designated 58 in FIGS. 1-4. Broadly speaking, the actuating mechanism 58 is selectively operable to move the attaching frame assembly 16 relative to the anchoring frame assembly 14 between the stored and extended conditions. Also, once the attaching frame assembly 16 has been moved to its extended condition and coupled to the fifth wheel 50 of the disabled tractor 52, the actuating mechanism 58 is selectively operable to move the attaching frame assembly 16 to and from the erected position relative to the anchoring frame assembly 14 so as to place the frame 60 of the disabled tractor 52 in a raised towing position.

The actuating mechanism 58 of the recovery unit 10 is actually composed of two actuating means 62 and 64. A first actuating means 62 includes a pair of crank arms 66 attached via brackets 68 to and extending generally perpendicularly outwardly from the longitudinal beams 18 of the attaching frame assembly 16. Also, a pair of telescopible actuators in the form of hydraulic cylinders 70, extend between and are pivotally connected at respective opposite cylinder and piston rod ends to the longitudinal beams 18 of the anchoring frame assembly 14 via brackets 72 and to the outer ends of the crank arms 66.

A second actuating means 64 includes a U-shaped auxiliary frame assembly 74 formed by a pair of laterally-spaced legs 76 being U-shaped in cross-section and a transverse member 78 extending between and rigidly interconnecting the rear ends of the legs 76. The front ends of the legs 76 are pivotally attached to the longitudinal beams 18 of the anchoring frame assembly intermediate their ends by pins 80. A reinforcing rail 82 also extends between and rigidly interconnects the legs 76. The second actuating means 64 also includes a telescopible actuator in the form of another hydraulic cylinder 84 which extends between and is pivotally attached at its respective piston rod and cylinder ends to the middle of the transverse member 78 of the auxiliary frame assembly 74 and to the upper end of an upright post 86 fixed to the middle of the rear cross beam 20 of the anchoring frame assembly 14. Finally, the second actuating means 64 includes a pair of support arms 88 attached to and extending perpendicularly from a pipe 90 rotatably mounted to and extending parallel along the transverse member 78 of the auxiliary frame assembly 74. A handle 92 is fixed to and extends axially from one end of the pipe 90 to outside of the anchoring frame assembly 14 where it can be readily gripped by the operator to rotate the support arms 88 for purposes which will become clear below. The support arms 88 are rotatable between generally horizontal nonsupporting and generally vertical supporting positions, as seen respectively in solid and phantom line forms in FIG. 4, wherein the concave-shaped outer ends 94 of the support arms 88 are respectively disengageable from and engageable with similiarly-shaped arcuate stops 96 on the crank arms 66 of the first actuating means 62 on the attaching frame assembly 16 when the latter is at its stored condition. Springs 98 extend between and interconnect the rear cross beam 20 of the anchoring frame assembly 14 and braces 100 being interconnected to the support arms 88 and pipe 90 so as to bias the support arms 88 to move toward their vertical supporting positions, seen in phantom in FIG. 4. The remaining parts of the recovery unit 10 and the operation of the first and second actuating means 62,64 will now be described in conjunction with a description of the overall operation of the unit.

FIGS. 7 to 12 show the sequence of stages through which the anchoring and attaching frame assemblies 14,16 and the first and second actuating means 62,64 of the recovery unit progressively move to form the assemblies into a solid towing beam interconnecting the fifth wheels 48,50 of the respective tractors 12,52.

Figure 7:
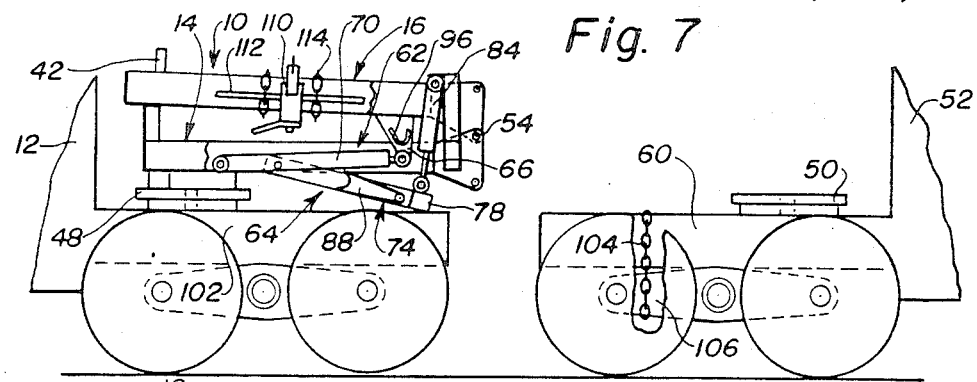

In FIG. 7, the towing truck 12 mounting the recovery unit 10 with the attaching frame assembly 16 in its stored condition is backed up near to the rear of the disabled tractor 52. The anchoring frame assembly 14 of the unit is coupled to the fifth wheel 48 of the towing tractor 12, whereas the objective will be to couple the attaching frame assembly 16 to the fifth wheel 50 of the disabled tractor 52 and raise its frame 60 into a towing position.

The hydraulic cylinders 70 of the first actuating means 62 are selectively operable to pivotally move the attaching frame assembly 16 relative to the anchoring frame assembly 14 between the stored and extended conditions. However, when the attaching frame assembly 16 is in its stored condition, as seen in FIG. 7, it is readily apparent that the parallel axially-directed lines of action of the first actuating means cylinders 70 extend below the pivotal axis of the attaching frame assembly 16 defined by the upper pins 54 which pivotally connect the assemblies 14,16 together. Thus, operation of the first actuating means 62 alone will not move the attaching frame assembly 16 from its stored to extended conditions. The second actuating means 64 must be operated in coordination with the first actuating means 62 to accomplish such change in the condition of the attaching frame assembly 16.

The objective is to raise the lines of action of the hydraulic cylinders 70 so that they extend above the pivotal axis defined by the upper pins 54. This is achieved by the operator first extending the hydraulic cylinder 84 of the second actuating means 64, from the position seen in FIG. 7 to that seen in FIG. 8, to pivotally move the auxiliary frame assembly 74 downwardly away from the anchoring frame assembly 14. Since its transverse member 78 is in contact with the frame 102 of the towing tractor 12, extension of the hydraulic cylinder 84 raises the anchoring frame assembly 14 causing it and the fifth wheel 48 to pivotally tilt relative to the frame 102 of the towing tractor. Extension of the hydraulic cylinder 84 is continued by the operator until the rear portion of the anchoring frame assembly 14, and the front portion of the attaching frame assembly 16 therewith, have been raised enough to allow the support arms 88 to be pivoted to their vertical supporting positions, in which they will engage the stops 96 on the crank arms 66, as seen in FIG. 8.

Figure 8:
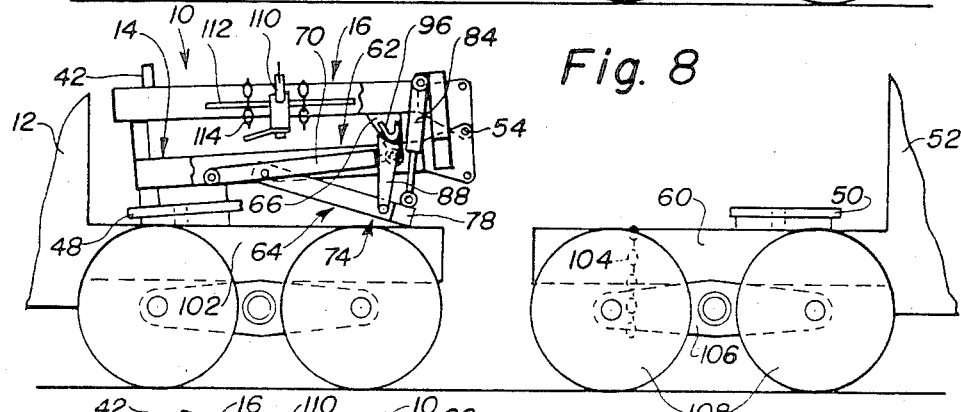
Figure 9:
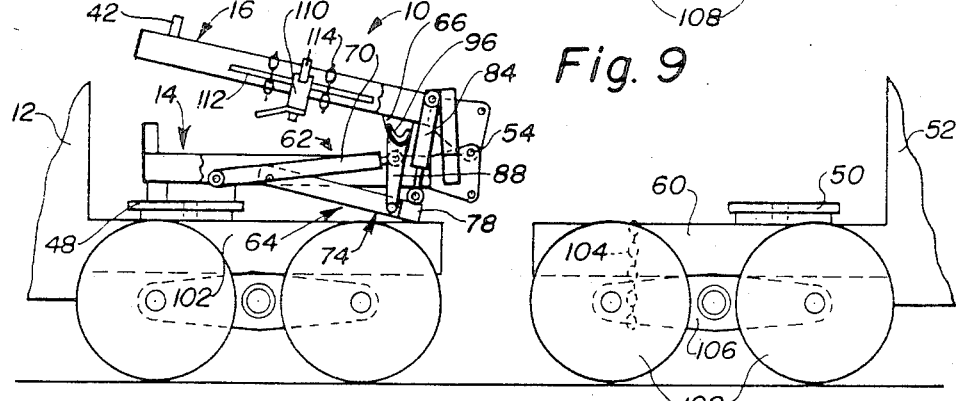
Figure 10:
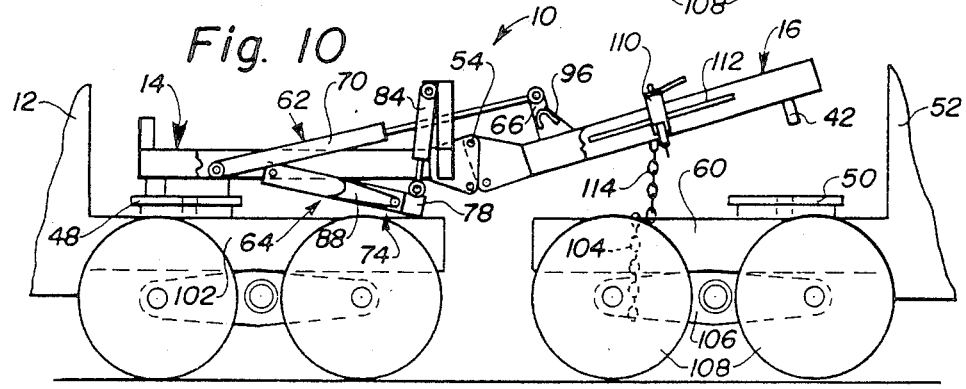

After the support arms 88 have been rotated to their vertical positions shown in FIG. 8, the operation of the hydraulic cylinder 84 is reversed by the operator causing it to retract to the position seen in FIG. 9, which, in turn, causes the attaching frame assembly 16 to pivot upwardly away from the anchoring frame assembly 14, beginning its movement from its stored condition toward its extended condition. Simultaneously, the operator causes the hydraulic cylinders 70 of the first actuating means 62 to fully retract. Then, as the attaching frame assembly 16 pivots upwardly, their lines of action soon move above the pivotal axis of the attaching frame assembly 16 defined by the upper pins 54. Once they are above the pivotal axis as seen in Fig. 9, operation of the cylinders 70 is reversed by the operator and they are now extended which continues the pivoting of the attaching frame assembly 16 toward its extended condition, as depicted in FIG. 10.

Such pivoting of the attaching frame assembly 16 will bring its king pin 42 near to the fifth wheel 50 of the disabled tractor 52. The towing tractor 12 can then be backed toward the disabled tractor 52 to complete coupling of the king pin 42 to the fifth wheel 50, as seen in FIG. 11. At this point, the frame assemblies 14,16 of the unit 10 are resting on the respective frames 102,60 of the tractors 12,52. Previously, a chain 104 (first seen in FIG. 7) was used to secure the rear axle 106 of the disabled tractor 52 to its frame 60 so that it and the rear wheels 108 will raise with the rear portion of the frame 60. Now, another means is employed for attaching the frame 60 of the towed tractor 52 to the attaching frame assembly 16. The attaching means is in the form of a pair of adjustable brackets 110 slidable along ledges 112 (only one is seen in FIGS. 5 and 6) on the longitudinal beams 18 and flexible chains 114 connected to the brackets 110 which are used by the operator to interconnect the brackets and the frame 60 of the disabled tractor 52.

After the attaching frame assembly 16 is coupled to the fifth wheel 50 of the disabled tractor 52 and the chains 144 extended about the disabled tractor frame 60, the second actuating means hydraulic cylinder 84 is again extended from the position seen in FIG. 11 to that of FIG. 12, concurrently and in coordination with extension of the first actuating means hydraulic cylinders 70. Such operation of the cylinders 84,70 by the operator causes the attaching frame assembly 16 to be moved to its erected position causing the frame 60 of the disabled tractor 52 to be tilted and placed in a raised towing position, as seen in FIG. 12. The operator then inserts pins 56 into lower holes 36,44 to lock the assemblies 14,16 together in the erected position to form the solid towing beam extending between and interconnecting the fifth wheels 48,50 of the respective tractors 12,52. Reversal of the above-described operations will result in detachment of the attaching frame assembly 16 of the recovery unit 10 from the disabled tractor 52 after arrival at the repair service facility.

It is thought that the disabled truck tractor recovery unit of the present invention and many of its attendant advantages will be understood from the foregoing description and it will be apparent that various changes may be made in the form, construction and arrangement of the parts thereof without departing from the spirit and scope of the invention or sacrificing all of its material advantages, the form hereinbefore described being merely a preferred or exemplary embodiment thereof.

We claim:

1. A recovery unit for use by one truck tractor in towing another truck tractor wherein each tractor has a fifth wheel, said recovery unit comprising:
   (a) first frame means adapted to be coupled to a fifth wheel of a towing tractor;
   (b) second frame means adapted to be coupled to a fifth wheel of a towed tractor, said second frame means being mounted to said first frame means for pivotal movement relative thereto between a stored condition wherein it is disposed adjacent said first frame means and incapable of being coupled to the fifth wheel of the towed tractor and an extended condition wherein it forms an extension of said first frame means and is capable of being coupled to the fifth wheel of the towed tractor; and
   (c) an actuating mechanism being selectively operable to pivotally move said second frame means relative to said first frame means between said stored and extended conditions, said actuating mechanism also being selectively operable to pivotally move said second frame means to and from an erected position relative to said first frame means once said second frame means has been first moved to its extended condition and coupled to the fifth wheel of the towed tractor, said pivotal movement of said second frame means to its erected position causing a portion of a frame of the towed tractor to be placed in a raised towing position.

2. The recovery unit as recited in claim 1, wherein said first frame means has front and rear portions and includes a king pin mounted at its front portion for coupling to the fifth wheel of the towing tractor and pivot means defined at its rear portion.

3. The recovery unit as recited in claim 2, wherein said second frame means has forward and rearward portions and includes a king pin mounted at its rearward portion for coupling to the fifth wheel of the towed tractor and complementary pivot means defined at its forward portion being pivotally connected to said pivot means of said first frame means.

4. The recovery unit as recited in claim 1, wherein said actuating mechanism includes:
first actuating means being selectively operable to move said second frame means relative to said first frame means between said stored and extended conditions, said first actuating means also being operable to move said second frame means to and from an erected position relative to said first frame means once said second frame means has been first moved to its extended condition and coupled to the fifth wheel of the towed tractor; and
second actuating means being selectively operable to move said first frame means relative to a frame of the towing tractor after being coupled to the fifth wheel of the towing tractor and to move said second frame means relative to said first frame means in coordination with operation of said first actuating means to move said second frame means relative to said first frame means between said stored and extended conditions, and after said second frame means is moved to said extended conditions and coupled to the fifth wheel of the towed tractor, to move said second frame means to said erected position causing the portion of the frame of the towed tractor to be placed in the raised towing position.

5. The recovery unit as recited in claim 4, wherein said first actuating means includes:
at least one crank arm attached to and extending outwardly from said second frame means; and
at least one telescopible actuator pivotally attached at its opposite ends to and extending between said first frame means and an outer end of said crank arm.

6. The recovery unit as recited in claim 5, wherein said second actuating means includes:
an auxiliary frame means pivotally attached to said first frame means for pivotal movement toward and into contact with the frame of the towing tractor;
at least one telescopible actuator pivotally attached to and extending between said auxiliary frame means and said first frame means for pivoting said first frame means relative to said auxiliary frame means and thereby to the frame of the towing tractor when the auziliary frame means is in contact with the frame of the towing tractor; and
at least one support arm pivotally attached to the auxiliary frame means and selectively movable relative thereto between nonsupporting and supporting positions wherein said support arm is respectively disengaged from and engaged with said crank arm of said first actuating means.

7. The recovery unit as recited in claim 6, wherein said support arm is biased to move toward its supporting position.

8. The recovery unit as recited in claim 1, further comprising:
flexible means for attaching the frame portion of the towed tractor to said second frame means prior to said second frame means being moved to said erected position.

9. The recovery unit as recited in claim 1, further comprising:
locking means for connecting said second frame means to said first frame means after said second frame menas is moved to said erected position to form said first and second frame means into a solid towing beam interconnecting the fifth wheels of the towing and towed tractors.

10. The recovery unit as recited in claim 1, further comprising:
a plurality of support members supportable on the ground and releasably attachable in upright relationship to said first frame means for supporting said unit in a free-standing condition with said second frame means thereof in said stored condition adjacent to said first frame means so as to facilitate removal of said unit from the towing tractor.

11. A recovery unit for use by one truck tractor in towing another truck tractor wherein each tractor has a fifth wheel, said recovery unit comprising:
(a) an anchoring frame assembly adapted to be coupled to a fifth wheel of a towing tractor;
(b) an attaching frame assembly adapted to be coupled to a fifth wheel and a frame of a towed tractor, said attaching frame assembly being mounted to said anchoring frame assembly for pivotal movement relative thereto between a stored condition wherein it overlies said anchoring frame assembly and is incapable of being coupled to the fifth wheel and frame of the towed tractor and an extended condition wherein it forms an extension of said anchoring frame assembly and is capable of being coupled to the fifth wheel and frame of the towed tractor;
(c) first actuating means being selectively operable to pivotally move said attaching frame assembly relative to said anchoring frame assembly between said stored and extended conditions, said first actuating means also being operable to pivotally move said attaching frame assembly to and from an erected position relative to said anchoring frame assembly once said attaching frame assembly has been first moved to its extended condition and coupled to the fifth wheel of the towed tractor; and
(d) second actuating means being selectively operable to pivotally tilt said anchoring frame assembly relative to a frame of the towing tractor when coupled to the fifth wheel of the towing tractor and to pivotally move said attaching frame assembly relative to said anchoring frame assembly in coordination with operation of said first actuating means to move said attaching frame assembly relative to said anchoring frame assembly between said stored and extended conditions and, after said attaching frame assembly is moved to said extended condition and coupled to the fifth wheel of the towed tractor, to move said attaching frame assembly to said erected position, said pivotal movement of said attaching frame assembly to its erected position causing a frame of the towed tractor to be placed in a raised position.

12. The recovery unit as recited in claim 11, wherein said anchoring frame assembly has front and rear portions and includes a king pin mounted at its front portion for coupling to the fifth wheel of the towing tractor and pivot means defined at its rear portion.

13. The recovery unit as recited in claim 12, wherein said attaching frame assembly has forward and rearward portions and includes a king pin mounted at its rearward portion for coupling to the fifth wheel of the towed tractor and complementary pivot means defined at its forward portion being pivotally connected to said pivot means of said anchoring frame assembly.

14. The recovery unit as recited in claim 11, wherein said first actuating means includes:
   at least one crank arm attached to and extending outwardly from said attaching frame assembly; and
   at least one telescopible actuator pivotally attached at its opposite ends to and extending between said anchoring frame assembly and an outer end of said crank arm.

15. The recovery unit as recited in claim 14, wherein said second actuating means includes:
   an auxiliary frame assembly pivotally attached to said anchoring frame assembly for pivotal movement toward and into contact with the frame of the towing tractor;
   at least one telescopible actuator pivotally attached to and extending between said auxiliary frame assembly and said anchoring frame assembly for pivoting said anchoring frame assembly relative to said auxiliary frame assembly and thereby to the frame of the towing tractor when the auxiliary frame assembly is in contact with the frame of the towing tractor; and
   at least one support arm pivotally attached to the auxiliary frame assembly and selectively movable relative thereto between nonsupporting and supporting positions wherein said support arm is respectively disengaged from and engaged with said crank arm of said first actuating means.

16. The recovery unit as recited in claim 15, wherein said support arm is biased to move toward its supporting position.

17. The recovery unit as recited in claim 11, further comprising:
   means for attaching the frame of the towed tractor to said attaching frame assembly prior to the latter being moved to said erected position.

18. The recovery unit as recited in claim 17, wherein said attaching means includes:
   at least one adjustable bracket mounted to said attaching frame assembly; and
   at least one flexible member for interconnecting said bracket and the frame of the towed tractor.

19. The recovery unit as recited in claim 11, further comprising:
   locking means for rigidly connecting said attaching frame assembly to said anchoring frame assembly after said attaching frame assembly is moved to said erected position to form said frame assemblies into a solid towing beam interconnecting the fifth wheel of the towing and towed tractors.

20. The recovery unit as recited in claim 11, further comprising:
   a plurality of support members supportable on the ground and releasably attachable in upright relationship to said anchoring frame assembly for supporting said unit in a free-standing condition with said attaching frame assembly thereof in said stored condition overlying said anchoring frame assembly so as to facilitate removal of said unit from the towing tractor.

* * * * *